(12) United States Patent
Silverbrook

(10) Patent No.: US 7,637,595 B2
(45) Date of Patent: *Dec. 29, 2009

(54) NOZZLE ARRANGEMENT FOR AN INKJET PRINTHEAD HAVING AN EJECTION ACTUATOR AND A REFILL ACTUATOR

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/116,930

(22) Filed: May 7, 2008

(65) Prior Publication Data

US 2008/0204515 A1 Aug. 28, 2008

Related U.S. Application Data

(63) Continuation of application No. 09/900,160, filed on Jul. 9, 2001, now Pat. No. 7,381,340, which is a continuation-in-part of application No. 09/112,778, filed on Jul. 10, 1998, now Pat. No. 6,416,168.

(30) Foreign Application Priority Data

Jul. 15, 1997 (AU) .................................... PO7991
Jul. 15, 1997 (AU) .................................... PO8057

(51) Int. Cl.
*B41J 2/04* (2006.01)
*B41J 2/05* (2006.01)

(52) U.S. Cl. .......................................... 347/54; 347/65

(58) Field of Classification Search .................... 347/47, 347/54, 56, 65, 69
See application file for complete search history.

(56) References Cited

U.S. PATENT DOCUMENTS 4,423,401 A 12/1983 Mueller (Continued)

FOREIGN PATENT DOCUMENTS

DE 1648322 A 3/1971

(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-'7157.

(Continued)

*Primary Examiner*—An H Do

(57) ABSTRACT

A nozzle arrangement for an inkjet printhead is provided. The nozzle arrangement includes a wafer substrate defining a nozzle chamber and drive circuitry and ink passivation layers defining an inlet to the chamber. An etch stop layer forms a roof layer for the chamber with an ink ejection port defined in the roof layer. The nozzle arrangement also includes an ejection actuator and a refill actuator collectively spanning the inlet, said ejection actuator actuatable via the drive circuitry layer to eject ink from the ejection port, and said refill actuator actuatable via the drive circuitry layer to facilitate refilling of the chamber with ink via the inlet.

7 Claims, 7 Drawing Sheets

U.S. PATENT DOCUMENTS

| | | | |
|---|---|---|---|
| 4,553,393 A | 11/1985 | Ruoff | |
| 4,672,398 A | 6/1987 | Kuwabara et al. | |
| 4,733,823 A | 3/1988 | Waggener et al. | |
| 4,737,802 A | 4/1988 | Mielke | |
| 4,864,824 A | 9/1989 | Gabriel et al. | |
| 5,029,805 A | 7/1991 | Albarda et al. | |
| 5,258,774 A | 11/1993 | Rogers | |
| 5,308,442 A | 5/1994 | Taub et al. | |
| 5,666,141 A | 9/1997 | Matoba et al. | |
| 5,719,604 A | 2/1998 | Inui et al. | |
| 5,802,686 A | 9/1998 | Shimada et al. | |
| 5,812,159 A | 9/1998 | Anagnostopoulos et al. | |
| 5,838,351 A | 11/1998 | Weber et al. | |
| 6,041,600 A | 3/2000 | Silverbrook | |
| 6,174,050 B1 * | 1/2001 | Kashino et al. | 347/65 |
| 6,258,285 B1 | 7/2001 | Silverbrook | |
| 6,416,168 B1 * | 7/2002 | Silverbrook | 347/54 |

FOREIGN PATENT DOCUMENTS

| | | | |
|---|---|---|---|
| DE | 2905063 A | 8/1980 |
| DE | 3245283 A | 6/1984 |
| DE | 3430155 A | 2/1986 |
| DE | 3716996 A | 12/1988 |
| DE | 3934280 A | 4/1990 |
| DE | 4328433 A | 3/1995 |
| DE | 19516997 A | 11/1995 |
| DE | 19517969 A | 11/1995 |
| DE | 19532913 A | 3/1996 |
| DE | 19623620 A1 | 12/1996 |
| DE | 19639717 A | 4/1997 |
| EP | 0092229 A | 10/1983 |
| EP | 0398031 A | 11/1990 |
| EP | 0427291 A | 5/1991 |
| EP | 0431338 A | 6/1991 |
| EP | 0478956 A | 4/1992 |
| EP | 0506232 A | 9/1992 |
| EP | 0510648 A | 10/1992 |
| EP | 0627314 A | 12/1994 |
| EP | 0634273 A2 | 1/1995 |
| EP | 0713774 A2 | 5/1996 |
| EP | 0737580 A | 10/1996 |
| EP | 0750993 A | 1/1997 |
| EP | 0882590 A | 12/1998 |
| FR | 2231076 A | 12/1974 |
| GB | 792145 A | 3/1958 |
| GB | 1428239 A | 3/1976 |
| GB | 2262152 A | 6/1993 |
| JP | 58-112747 A | 7/1983 |
| JP | 58-116165 A | 7/1983 |
| JP | 61-025849 A | 2/1986 |
| JP | 61-268453 A | 11/1986 |
| JP | 01-105746 A | 4/1989 |
| JP | 01-115639 A | 5/1989 |
| JP | 01-128839 A | 5/1989 |
| JP | 01-257058 A | 10/1989 |
| JP | 01-306254 A | 12/1989 |
| JP | 02-050841 A | 2/1990 |
| JP | 02-092643 A | 4/1990 |
| JP | 02-108544 A | 4/1990 |
| JP | 02-158348 A | 6/1990 |
| JP | 02-162049 A | 6/1990 |
| JP | 02-265752 A | 10/1990 |
| JP | 03-065348 A | 3/1991 |
| JP | 03-112662 A | 5/1991 |
| JP | 03-180350 A | 8/1991 |
| JP | 04-118241 A | 4/1992 |
| JP | 04-126255 A | 4/1992 |
| JP | 04-141429 A | 5/1992 |
| JP | 04-353458 A | 12/1992 |
| JP | 04-368851 A | 12/1992 |
| JP | 05-284765 A | 10/1993 |
| JP | 05-318724 A | 12/1993 |
| JP | 06-091865 A | 4/1994 |
| JP | 06-091866 A | 4/1994 |
| JP | 07-314665 A | 12/1995 |
| WO | WO 94/18010 A | 8/1994 |
| WO | WO 97/12689 A | 4/1997 |

OTHER PUBLICATIONS

Noworolski J M et al: "Process for in-plane and out-of-plane single-crystal-silicon thermal microactuators" Sensors and Actuators A, Ch. Elsevier Sequoia S.A , Lausane, vol. 55, No. 1, Jul. 15, 1996, pp. 65-69, XP004077979.*

Yamagata, Yutaka et al, "A Micro Mobile Mechanism Using Thermal Expansion and its Theoretical Analysis". Proceedings of the workshop on micro electro mechanical systems (MEMS), US, New York, IEEE, vol. Workshop 7, Jan. 25, 1994, pp. 142-147, XP000528408, ISBN: 0-7803-1834-X.*

* cited by examiner

NOZZLE ARRANGEMENT FOR AN INKJET PRINTHEAD HAVING AN EJECTION ACTUATOR AND A REFILL ACTUATOR

REFERENCES TO US APPLICATIONS

The present application is a Continuation application of U.S. application Ser. No. 09/900,160 filed Jul. 9, 2001, now issued U.S. Pat. No. 7,381,340, which itself is a continuation-in-part application of U.S. application Ser. No. 09/112,778, now issued U.S. Pat. Nos. 6,416,168, 6,213,589, 6,247,795, 6,394,581, 6,244,691, 6,257,704, 6,416,168, 6,220,694, 6,234,610, 6,247,793, 6,264,306, 6,241,342, 6,254,220, 6,302,528, 6,239,821, 6,247,796, 6,557,977 are hereby incorporated by reference.

FIELD OF THE INVENTION

This invention relates to ink jet printheads. More particularly, this invention relates to an ink jet printhead chip that incorporates an etch stop layer.

BACKGROUND TO THE INVENTION

The Applicant has invented an ink jet printhead that is capable of generating text and images at a resolution of up to 1600 dpi.

In order to achieve this, the Applicant has made extensive use of micro electro-mechanical systems technology. In particular, the Applicant has developed integrated circuit fabrication techniques suitable for the manufacture of such printheads. The Applicant has filed a large number of patent applications in this field, many of which have now been allowed.

The printheads developed by the Applicant can include up to 84000 nozzle arrangements. Each nozzle arrangement has at least one moving component which serves to eject ink from a nozzle chamber. These components usually either act directly on the ink or act on a closure which serves to permit or inhibit the ejection of ink from the nozzle chamber. The moving components are microscopically dimensioned. This is necessary, given the large number of nozzle arrangements per printhead.

Such printheads usually incorporate at least one printhead chip. Where more than one printhead chip is required, the printhead chips are aligned to define what can be regarded as a single, elongate chip. The constraints on the dimensions of silicon wafers which are available result in the necessity for having more than one printhead chip defining a single printhead.

Those of ordinary skill in the field of integrated circuit fabrication techniques will appreciate that the cost of on-chip real estate is extremely high. It is therefore important that a configuration be selected which is efficient and yet which uses a minimum amount of space in order to keep costs to a minimum. Furthermore, it should also be borne in mind that integrated circuit fabrication techniques involve what is generally a deposition and subsequent etching process. As such, devices manufactured in accordance with such techniques are usually layered for ease of construction and also as a result of the methods used to construct such devices. It follows that it is desirable that the structure of the printhead together with the method in which the printhead is manufactured accommodates a layered configuration. This will facilitate ease of construction with a consequent reduction in costs.

The present invention has been conceived by the Applicant in an attempt to provide a printhead chip configuration which effectively overcomes the difficulties identified above.

SUMMARY OF THE INVENTION

According to a first aspect of the invention, there is provided a method of manufacturing an ink jet printhead, the method comprising the steps of:

depositing a layer of etch stop material on a front side of a wafer substrate;

etching the wafer substrate up to the etch stop material to define a plurality of nozzle chambers and so that portions of the etch stop layer define roof walls for respective nozzle chambers; and etching each said portion to form at least one ink ejection port in each said portion.

According to a second aspect of the invention there is provided an ink jet printhead chip that is manufactured in accordance with an integrated circuit fabrication technique, the printhead chip comprising a wafer substrate that defines a plurality of nozzle chambers as a result of an etching process;

an etch stop layer positioned on a front side of the wafer substrate so that portions of the etch stop layer define a roof wall for each nozzle chamber, each said portion defining at least one ink ejection port, also a result of an etching process carried out on each portion; and a plurality of actuators arranged on a back side of the wafer substrate, each actuator being operatively positioned relative to each respective nozzle chamber to eject ink from the nozzle chambers.

The invention is now described, by way of example, with reference to the accompanying drawings. The specific nature of the following description should not be construed as limiting in any way the broad nature of this summary.

DETAILED DESCRIPTION OF THE DRAWINGS

Figure 1:
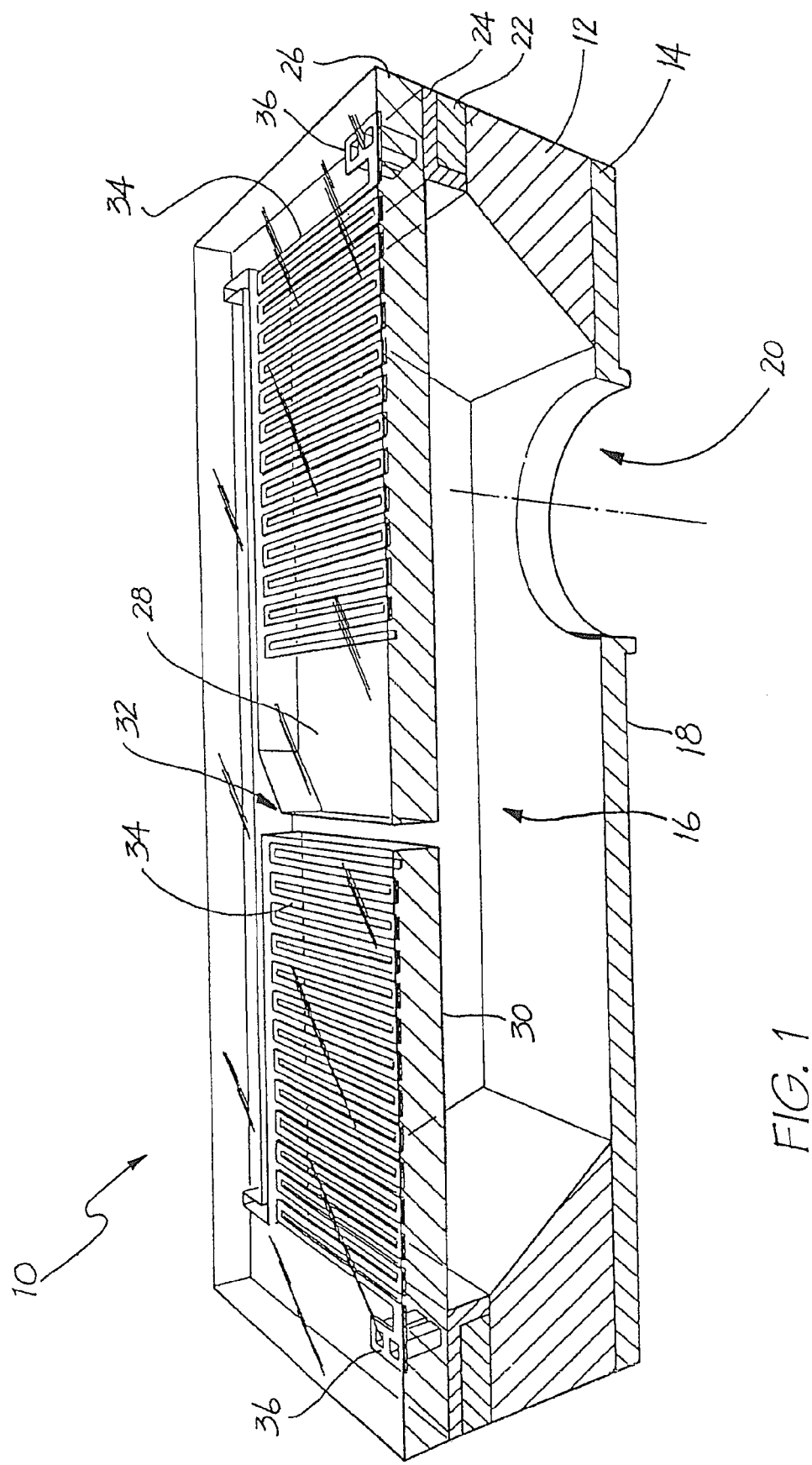
FIG. 1 shows a three-dimensional, sectioned view of a first embodiment of a printhead chip, in accordance with the invention.
Figure 2:
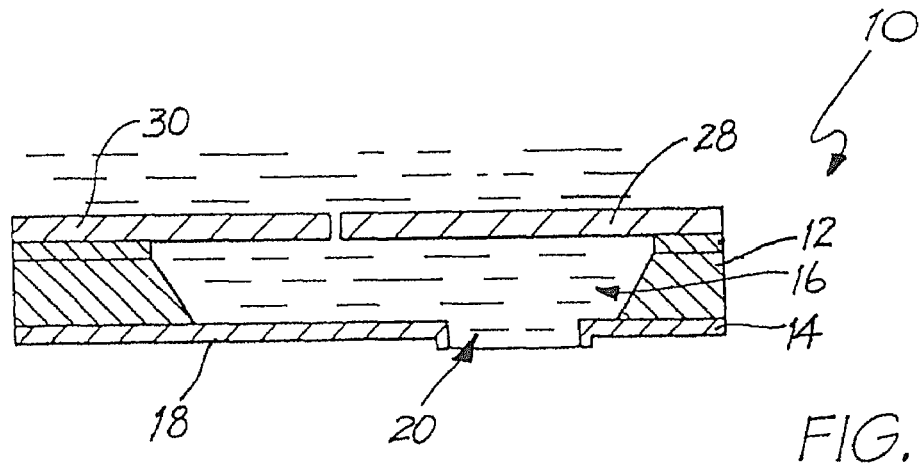
FIG. 2 shows a schematic view of a nozzle arrangement of the printhead chip in a quiescent condition.
Figure 3:
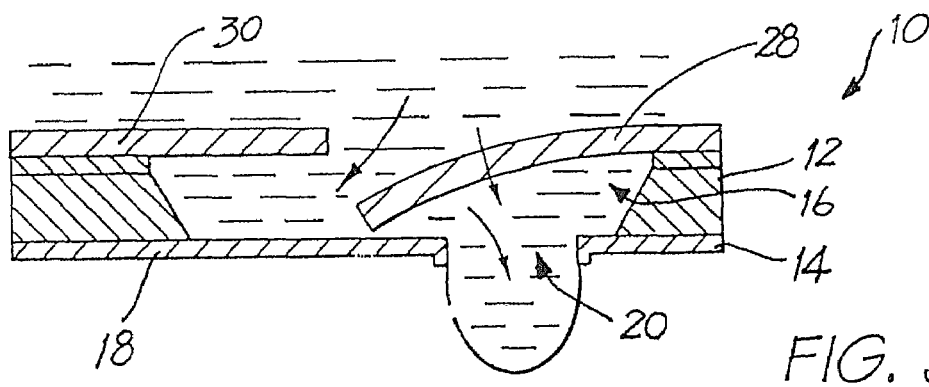
FIG. 3 shows a schematic view of the nozzle arrangement of FIG. 2 with an ejection actuator in an operative condition.
Figure 4:
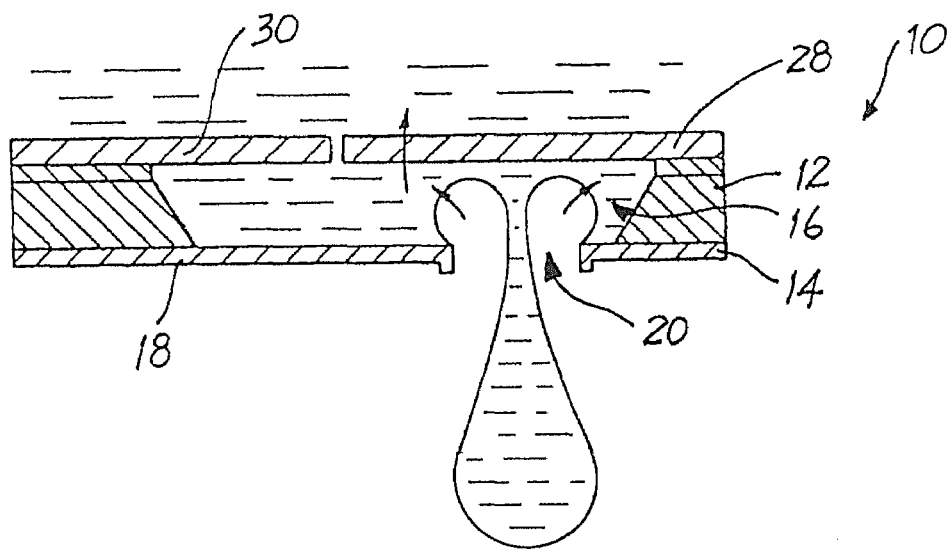
FIG. 4 shows a schematic view of the nozzle arrangement of FIG. 2 with the ejection actuator in a post-operative condition.
Figure 5:
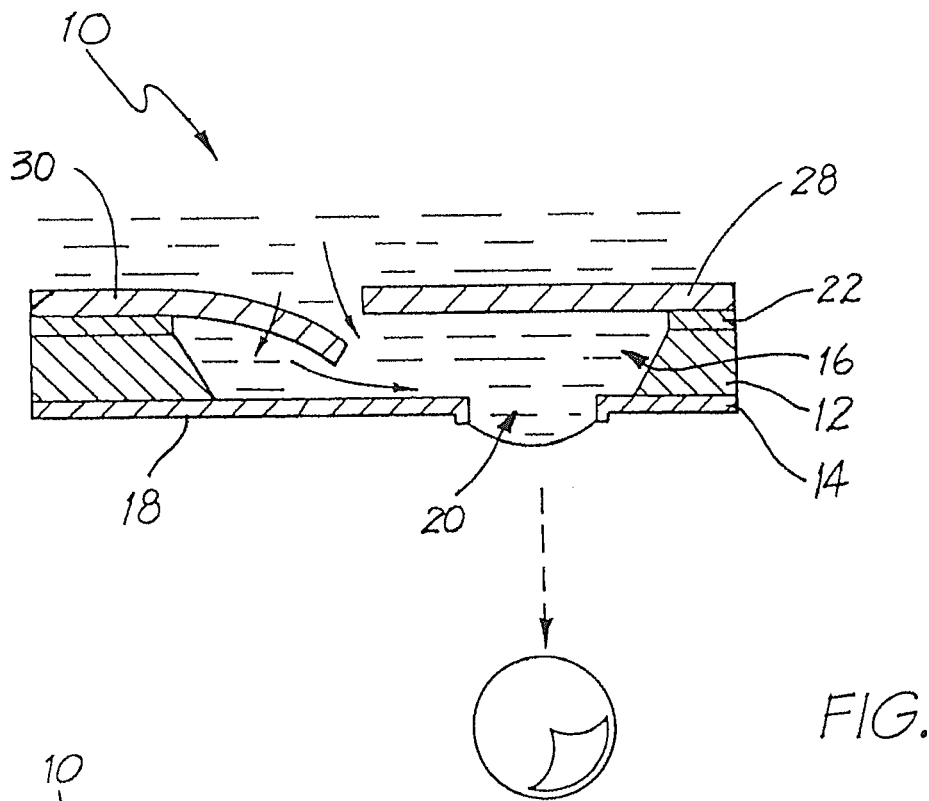
FIG. 5 shows a schematic view of the nozzle arrangement of FIG. 2 with a refill actuator in an operative condition.
Figure 6:
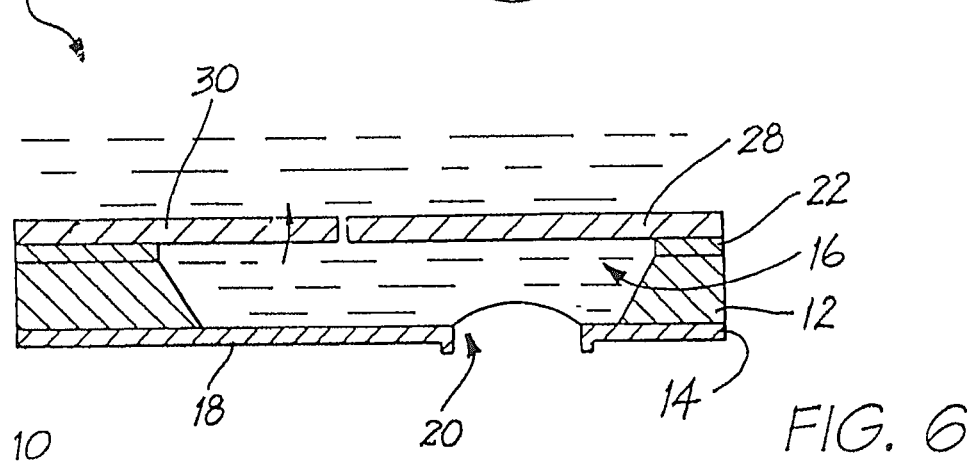
FIG. 6 shows a schematic view of the nozzle arrangement of FIG. 2 with the refill actuator in a post-operative condition.
Figure 7:
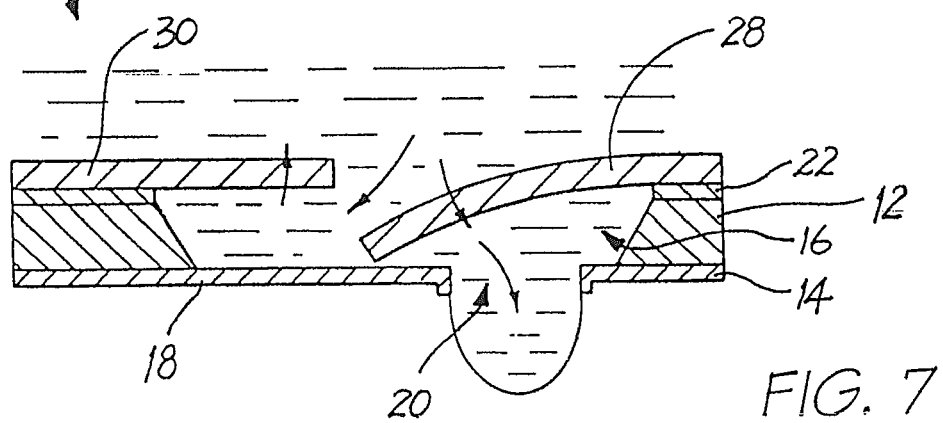
FIG. 7 shows the nozzle arrangement of FIG. 2 again with the ejection actuator in an operative condition.

In the following specific description, reference is made in particular to a nozzle arrangement of a printhead chip, in accordance with the invention. The reason for this is that the printhead chip comprises a plurality of the nozzle arrangements shown in each of the following embodiments. Thus, for ease of description and for the sake of convenience, reference is made in the following description to a single nozzle arrangement. It will readily be appreciated that since the nozzle arrangements of the following examples are manufactured in accordance with an integrated circuit fabrication technique, duplication of the nozzle arrangements on a single printhead chip would be a natural consequence of the manufacture of such nozzle arrangements.

In FIGS. 1 to 7, reference numeral 10 generally indicates a nozzle arrangement forming part of a first embodiment of a printhead chip, in accordance with the invention.

The nozzle arrangement 10 includes a wafer substrate 12. An etch stop layer 14 is formed on a front surface of the wafer substrate 12. The etch stop layer 14 is in the form of a layer of boron doped epitaxial silicon. It will thus be appreciated that the etch stop layer 14 provides a suitable etch stop for the etching of the wafer substrate 12 to define a nozzle chamber 16. In particular, the etch stop layer 14 can therefore be provided to define a roof wall 18 of the nozzle arrangement 10.

The roof wall 18 is etched to define an ink ejection port 20.

A drive circuitry layer 22 is formed, by a deposition and etching process, on the wafer substrate 12. Specific details of the fabrication of the drive circuitry layer are provided in the above referenced US applications and will therefore not be described in any detail in this specification.

An ink passivation layer 24 is deposited on the drive circuitry layer 22 to protect the drive circuitry layer 22. The ink passivation layer 24 can be of any suitable material such as silicon nitride.

In this particular example, a layer 26 of expansion material is deposited on the ink passivation layer 24.

The layer of expansion material 26 is etched to define an ejection actuator 28 and a refill actuator 30 which span an inlet 32 of the nozzle chamber 16. The expansion material has a coefficient of thermal expansion which is such that expansion of the material upon heating can be harnessed to perform work.

Thus, each of the actuators 28, 30 has a heater element 34 positioned therein. Each heater element 34 is connected to the drive circuitry layer 22 with suitable vias 36.

Operation of the ejection and refill actuators 28, 30 is clearly shown in FIGS. 2 to 7. Furthermore, the operation and structure of the actuators 28, 30 are set out in further detail in the above referenced applications. Accordingly, these will not be dealt with in any detail in this specification.

The significance of the configuration of the nozzle arrangement 10 is that the nozzle chamber 16 is defined in the wafer substrate 12 with the etch stop layer 14 defining the roof wall 18 which, in turn, is etched to define the ink ejection port 20. This particular configuration provides a high accuracy of manufacture. Further, the structure of the nozzle arrangement 10 is monolithic, which in itself provides a low cost of manufacture. Still further, the configuration of the layers inhibits differential expansion upon heating thereby enhancing the life of the nozzle arrangement 10.

Figure 8:
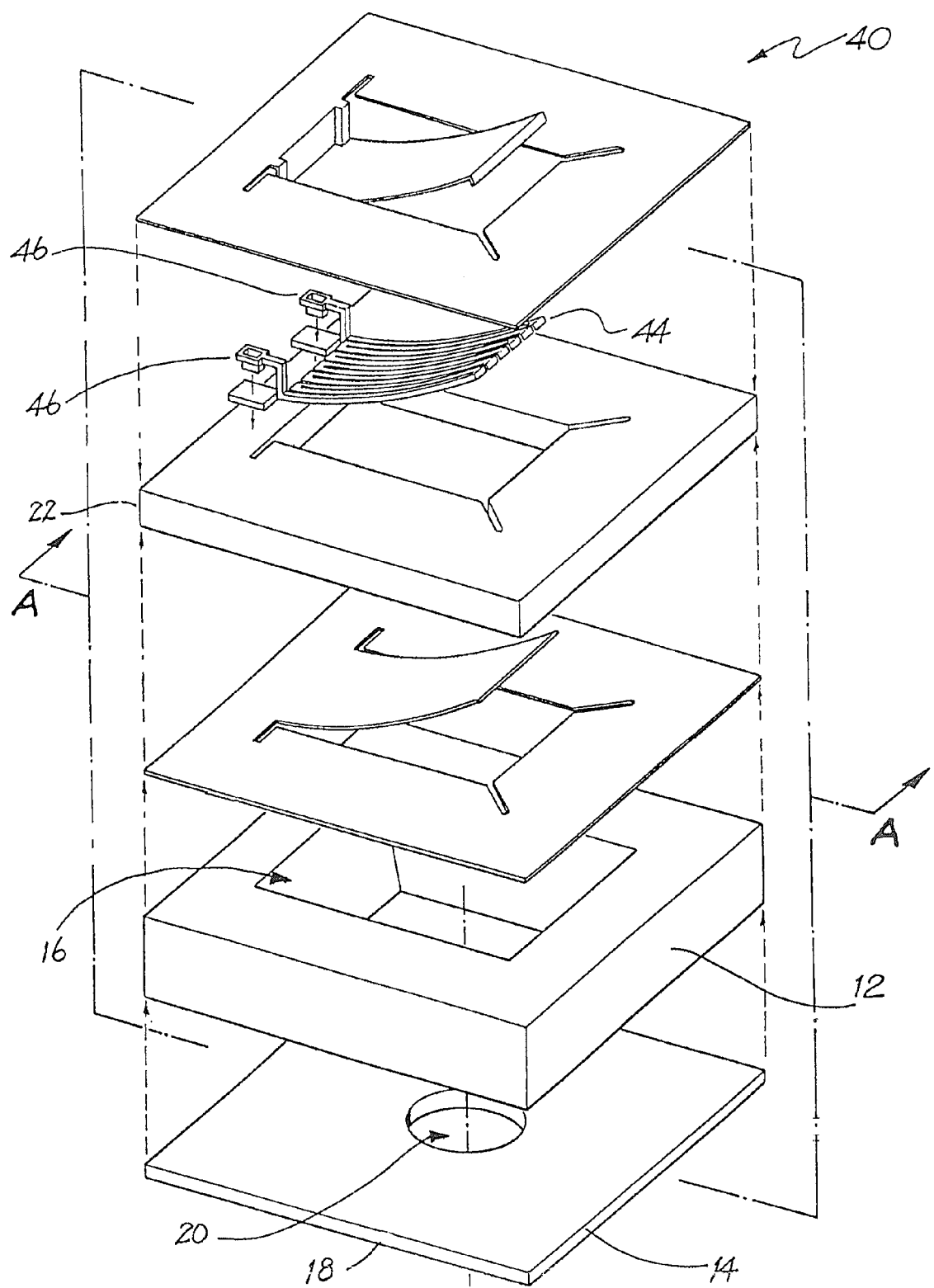
FIG. 8 shows an exploded, three-dimensional view of a second embodiment of part of a printhead chip, in accordance with the invention.
Figure 9:
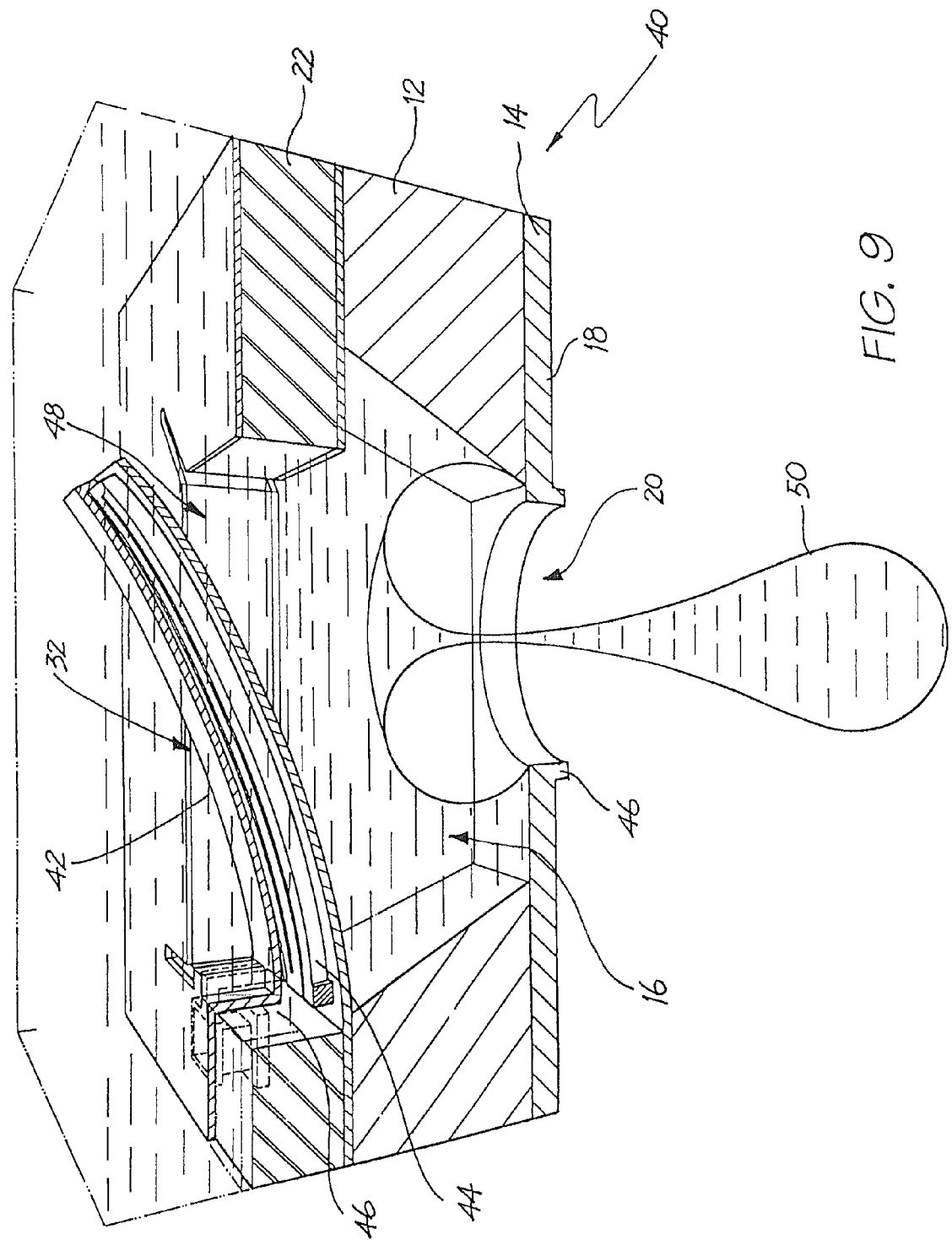
FIG. 9 shows a sectioned side view of a nozzle arrangement of the printhead chip of FIG. 8 in a post-operative condition.

In FIG. 8, reference numeral 40 generally indicates a nozzle arrangement of a second embodiment of a printhead chip, in accordance with the invention. With reference to FIGS. 1 to 7, like reference numerals refer to like parts, unless otherwise specified.

As with the previous embodiment, details of the structure and operation of the nozzle arrangement 40 are clearly set out in the above referenced applications.

This particular example utilizes a thermal actuator 42 which includes a heater element 44 that is manufactured of a shape memory alloy. In FIG. 8, the heater element 44 is formed into the shape shown while below its transformation temperature. The heater element 44 is configured so that, above its transformation temperature, the heater element 44 is generally planar. The heater element 44 is also configured to be resistively heated when a current is passed through the heater element 44. The heater element 44 is connected to the drive circuitry layer 22 with vias 46.

It follows that, when the heater element 44 is resistively heated through a passing of a current through the heater element 44, by way of the vias 46, resultant heating of the heater element 44 above the transformation temperature results in the heater element 44 returning to its planar state. Subsequent movement in the direction of an arrow 48 results in the ejection of a drop of ink 50 from the ink ejection port 20.

Figure 10:
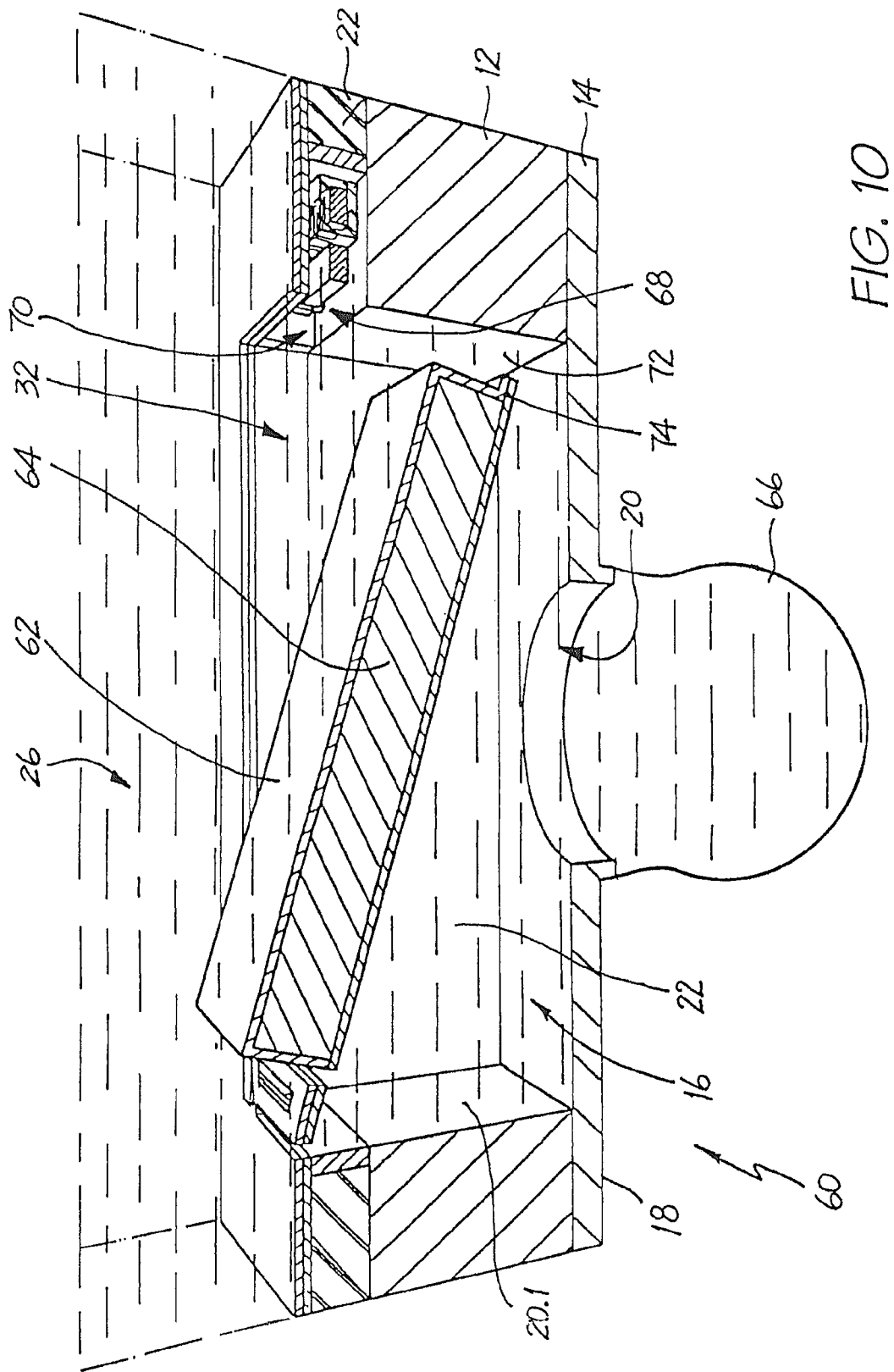
FIG. 10 shows a sectioned side view of a nozzle arrangement of a third embodiment of a printhead chip, in accordance with the invention, in an operative condition.
Figure 11:
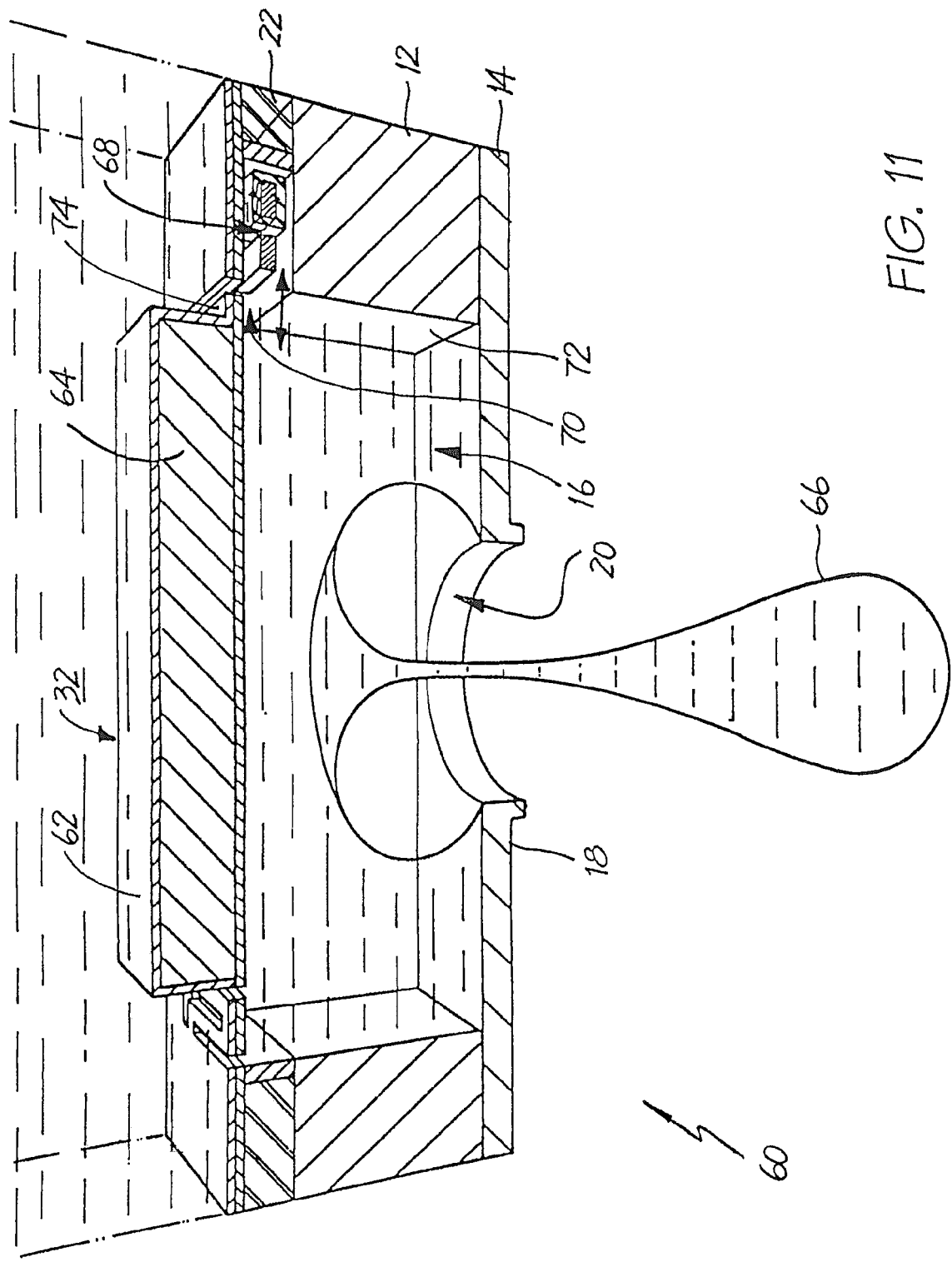
FIG. 11 shows a sectioned side view of the nozzle arrangement of FIG. 10 in a post-operative condition.

In FIGS. 10 and 11, reference numeral 60 generally indicates a nozzle arrangement of a third embodiment of a printhead chip, in accordance with the invention. With reference to FIGS. 1 to 9, like reference numerals refer to like parts, unless otherwise specified.

As with the previous embodiments, details of the manner in which the nozzle arrangement 60 is manufactured and its manner of operation are set out in the above referenced applications.

In this particular example, an actuator in the form of a paddle 62 is pivotally mounted in the inlet 32 of the nozzle chamber 16. The paddle 62 has a magnetic core 64. A magnetic field generator is positioned in proximity to the paddle 62 to provide a magnetic field with a repeatedly reversing polarity. The magnetic core 64 is configured to be sensitive to this magnetic field. It follows that, unhindered, the paddle 62 tends to oscillate in time with the repeatedly reversing polarity of the magnetic field.

The sensitivity of the magnetic core 64 and the strength of the magnetic field are such that, on each stroke of the paddle 62, an ink drop 66 is capable of being ejected from the ink ejection port 20.

In order to achieve selective ejection, a catch mechanism 68 is positioned in a recess 70 defined in a side wall 72 of the nozzle chamber 16. The catch mechanism 68 is connected to the drive circuitry layer 22 to be activated by the drive circuitry layer 22 under control of a suitable control system connected to the drive circuitry layer 22. On activation, as can be seen in FIG. 11, the catch mechanism 68 is displaced into the nozzle chamber 16 to engage an edge 74 of the paddle 62. Upon such engagement, the paddle 62 is inhibited from moving into the position shown in FIG. 10. Thus, by activating the catch mechanism 68, drop ejection can be inhibited. Thus, selective drop ejection from the nozzle arrangement 60 can be achieved.

It will be appreciated that there are many other configurations which can be achieved utilizing a nozzle chamber defined in the wafer substrate with an etch stop layer defining a roof wall of the nozzle chamber. The above examples are simply provided to illustrate a number of these configurations.

Applicant believes that this invention provides a means whereby a printhead chip can be manufactured to incorporate the high number of nozzle arrangements and resultant nozzle arrangement density, as set out in the preamble, at a cost which is competitive and with a minimum amount of complexity. Further, the Applicant believes that this invention provides a means whereby the nozzle arrangements can be manufactured accurately, which is extremely important, given the large number of nozzle arrangements per printhead chip. Still further, the invention facilitates monolithic construction since the nozzle chambers are defined by the wafer substrate and are not positioned on the wafer substrate as a result of a further process.

I claim:

1. A nozzle arrangement for an inkjet printhead, said nozzle arrangement comprising:
    a wafer substrate defining a nozzle chamber and drive circuitry and ink passivation layers defining an inlet to the chamber;
    an etch stop layer forming a roof layer for the chamber, an ink ejection port defined in the roof layer; and
    an ejection actuator and a refill actuator collectively spanning the inlet, said ejection actuator actuatable via the drive circuitry layer to eject ink from the ejection port, and said refill actuator actuatable via the drive circuitry layer to facilitate refilling of the chamber with ink via the inlet.

2. The nozzle arrangement of claim 1, wherein each actuator includes a heater element to facilitate actuation through thermal bending of the actuators.

3. The nozzle arrangement of claim 1, wherein each heater element is connected to the drive circuitry layer by means of vias through the ink passivation layer.

4. The nozzle arrangement of claim 1, wherein the roof layer is in the form of a layer of boron doped epitaxial silicon.

5. The nozzle arrangement of claim 1, having an ink passivation layer deposited on the drive circuitry layer, the ink passivation layer being a layer of silicon nitride.

6. The nozzle arrangement of claim 5, having a layer of expansion material deposited on the ink passivation layer.

7. The nozzle arrangement of claim 6, wherein the layer of expansion material is etched to define the ejection actuator and refill actuator, said expansion material having a coefficient of thermal expansion which is such that expansion of the material upon heating can be harnessed to perform work.

* * * * *